US011425077B2

(12) United States Patent
Korotkikh

(10) Patent No.: US 11,425,077 B2
(45) Date of Patent: Aug. 23, 2022

(54) METHOD AND SYSTEM FOR DETERMINING A SPAM PREDICTION ERROR PARAMETER

(71) Applicant: YANDEX EUROPE AG, Lucerne (CH)

(72) Inventor: Dmitry Sergeevich Korotkikh, d Avvakumovo (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 17/477,482

(22) Filed: Sep. 16, 2021

(65) Prior Publication Data

US 2022/0109649 A1     Apr. 7, 2022

(30) Foreign Application Priority Data

Oct. 6, 2020  (RU) .................................. 2020132851

(51) Int. Cl.
*H04L 51/212*  (2022.01)
*H04L 51/42*   (2022.01)
(Continued)

(52) U.S. Cl.
CPC .......... *H04L 51/212* (2022.05); *G06K 9/6276* (2013.01); *G06N 5/022* (2013.01); *H04L 51/224* (2022.05); *H04L 51/42* (2022.05)

(58) Field of Classification Search
CPC ... H04L 51/212; H04L 51/224; H04L 51/234; H04L 51/42
See application file for complete search history.

(56) References Cited

U.S. PATENT DOCUMENTS

| 8,291,024 B1* | 10/2012 | Cheng .................. G06Q 10/107 |
| | | 709/225 |
| 2009/0044013 A1* | 2/2009 | Zhu ....................... H04L 9/0891 |
| | | 713/170 |

(Continued)

OTHER PUBLICATIONS

Dada, "Machine learning for email spam filtering: review, approaches and open research problems.", Heliyon, vol. 5, Issue 6, 2019, ISSN 2405-8440, Jun. 2019, e01802 https://doi.org/10.1016/j.heliyon.2019.e01802.

*Primary Examiner* — Kostas J Katsikis
(74) *Attorney, Agent, or Firm* — BCF LLP

(57) ABSTRACT

Method and server for determining a spam prediction error parameter for a spam prediction parameter are disclosed. The method includes: receiving a plurality of emails destined to a plurality of users where a given email has a spam prediction parameter and a user-interaction parameter indicative of whether an associated recipient of the plurality of users agrees with the spam prediction parameter, and clustering the plurality of emails into at least two clusters having respective subsets of emails. For a given cluster the method includes determining a ground truth parameter by analyzing its subset of emails and the associated user-interaction parameters, and assigning the ground truth parameter to the given cluster. For the given email, the method includes generating the spam prediction error parameter based on a difference between the spam prediction parameter and the ground truth parameter, and storing the spam prediction error parameter in association with the given email.

20 Claims, 6 Drawing Sheets

(51) Int. Cl.
*G06N 5/02* (2006.01)
*G06K 9/62* (2022.01)
*H04L 51/224* (2022.01)

(56) References Cited

U.S. PATENT DOCUMENTS

| | | | |
|---|---|---|---|
| 2009/0089244 A1* | 4/2009 | Donato | G06Q 10/10 |
| | | | 707/999.102 |
| 2010/0017476 A1 | 1/2010 | Shue | |
| 2012/0215853 A1* | 8/2012 | Sundaram | H04L 51/212 |
| | | | 709/206 |
| 2015/0032824 A1* | 1/2015 | Kumar | H04L 51/04 |
| | | | 709/206 |
| 2018/0082062 A1* | 3/2018 | Hager | G06F 21/564 |
| 2018/0083903 A1* | 3/2018 | El-Alfy | H04W 4/14 |
| 2019/0080290 A1* | 3/2019 | Pandey | G06Q 10/107 |
| 2020/0380408 A1* | 12/2020 | Sridhar | G06F 21/60 |
| 2021/0168161 A1* | 6/2021 | Dunn | H04L 63/1425 |

\* cited by examiner

METHOD AND SYSTEM FOR DETERMINING A SPAM PREDICTION ERROR PARAMETER

CROSS-REFERENCE

The present application claims priority to Russian Patent Application No. 2020132851, entitled "Method and System for Determining a Spam Prediction Error Parameter", filed Oct. 6, 2020, the entirety of which is incorporated herein by reference.

FIELD

The present technology generally relates to e-mail services, and, in particular, to methods and systems for determining a spam prediction error parameter.

BACKGROUND

Electronic mail messages, usually shortened as "email" or "e-mail", have become very common means of communication. With the growing access to the Internet, the user has the ability to set up email accounts with an e-mail service and thereafter to access the e-mail account using a user electronic device to send and receive email messages, thereby replacing the standard post letter, the telephone, and the facsimile as the preferred means of communication.

The relative easiness to obtain an email account (often with no cost to the user) has also increased the number of spam messages being sent by malicious individuals and organizations. Spam messages, also known as junk email, is the indiscriminate sending of unsolicited email messages by email.

Many of the spam messages are commercial in nature, but may also contain links to web resources that, at least on a first appearance, may look like familiar web resources to the user (such as a web banking page of a bank or the like) which in fact lead to phishing web resources or to web resources that host malware.

In addition to being annoying and dangerous to the electronic device of the recipient, spam messages place considerable burden on email providers (such as Yandex™ Mail, Yahoo!™ Mail and the like) and the communication network. Indeed, spam messages account for a major portion of the daily internet email traffic and the email providers have developed spam filtering solutions to maintain user satisfaction, as well as integrity and workability of the network.

Generally speaking, there exist several computer-based approaches to reducing the number of spam messages to be received by a given recipient in the e-mail distribution system/service. For example, a simple approach adopted by email providers is to filter spam messages by looking at certain keywords (such as "Free drugs", "Cialis™", and the like). However, this filtering approach can easily be circumvented by the sender of spam messages by replacing the letters of the filtered keyword by letters that appear to be similar but are computationally distinct (such as replacing the Roman letter "K" with the Cyrillic letter "К").

SUMMARY

It is an object of the present technology to improve at least one drawback associated with the relevant prior art. More particularly, the developers of the present technology have devised methods and systems for determining a spam prediction error parameter. As such, it will be apparent to those skilled in the art that the present technology aims at detecting erroneous classification of emails as spam or otherwise non-spam, and in some cases, using this intelligence for adjusting one or more algorithms that erroneously classified one or more emails so as to potentially increase their classification performance. In other words, the spam prediction error parameter can be used to rain or re-train Machine Learning Algorithms (MLAs) for more accurately predict electronic spam messages to enable the e-mail service to properly handle such spam messages (for example, to place them in a spam folder).

In a first broad aspect of the present technology, there is provided a method of determining a spam prediction error parameter for a spam prediction parameter generated by a spam detection algorithm executed by a server. The server is associated with an email application and executes the spam detection algorithm. The method is executed by the server. The method comprises receiving, by the server, an indication of a plurality of emails destined to a plurality of users of the email application. A given one of the plurality of emails having (i) a respective spam prediction parameter indicative of the spam detection algorithm determining that the given one of the plurality of emails is one of a spam email and a non-spam email, and (ii) a user-interaction parameter indicative of whether an associated recipient of the plurality of users agrees with the respective spam prediction parameter. The method comprises clustering, by the server, the plurality of emails into at least two clusters. Each one of the at least two clusters has a respective subset of emails. The method comprises for a given cluster from the at least two clusters, determining, by the server, a respective ground truth parameter for the given cluster by analyzing the respective subset of emails and the associated user-interaction parameters. The respective ground truth parameter is one of the spam email and the non-spam email. The method comprises for the given cluster from the at least two clusters, assigning the respective ground truth parameter to the given cluster and each of the respective subset of emails contained therein. The method comprises for a given email from the given cluster, generating, by the server, the spam prediction error parameter based on a difference between the spam prediction parameter and the respective ground truth parameter. The method comprises for the given email from the given cluster, storing, by the server, the spam prediction error parameter in association with the given email from the given cluster.

In some embodiments of the method, the method further comprises determining, by the server, the user-interaction parameter based on at least one user interaction between the associated recipient and a respective email from the plurality of emails. The at least one user interaction has been collected from an email interface displayed to the associated recipient.

In some embodiments of the method, the user interaction is at least one of (i) moving the respective email into a folder of the email interface, and (ii) clicking a pre-determined button of the email interface.

In some embodiments of the method, the clustering the plurality of emails is executed based on email features similarity.

In some embodiments of the method, the clustering is executed using a K-Nearest Neighbor (KNN) algorithm.

In some embodiments of the method, the server further executes the email application.

In some embodiments of the method, the server is configured to connect to a mail server executing the email application.

In some embodiments of the method, the indication of the plurality of emails comprises the plurality of emails.

In some embodiments of the method, the indication of the plurality of emails comprises an embedding of each of the plurality of emails, the embedding indicative of a content of the plurality of emails and devoid of any identifiers of associated recipients.

In some embodiments of the method, the method further comprises analyzing, by the server, a total number of emails in a given subset of emails of an other given cluster from the at least two clusters, and in response to the number being below a pre-determined threshold, excluding, by the server, the other given cluster from further analysis.

In some embodiments of the method, the method further comprises retraining, by the server, the spam detection algorithm by using the spam prediction error parameter.

In some embodiments of the method, a given one of the at least two clusters comprises at least two sub-clusters.

In some embodiments of the method, the given one plurality of emails is clustered in both the given one of the at least two clusters and one of the at least two sub-clusters.

In some embodiments of the method, in response to the given one of the plurality of emails being associated with the ground truth parameter indicative of a wrong categorization in one of the given one of the at least two clusters and one of the at least two sub-clusters, a same value is used for the ground truth parameter for the given one plurality of electronic mail messages.

In some embodiments of the method, the ground truth parameter is independently assigned to the given one of the plurality of emails in one of the given one of the at least two clusters and one of the at least two sub-clusters.

In a second broad aspect of the present technology, there is provided a server for determining a spam prediction error parameter for a spam prediction parameter generated by a spam detection algorithm executed by the server. The server is associated with an email application and executes the spam detection algorithm. The server is configured to receive an indication of a plurality of emails destined to a plurality of users of the email application. A given one of the plurality of emails has (i) a respective spam prediction parameter indicative of the spam detection algorithm determining that the given one of the plurality of emails is one of a spam email and a non-spam email, and (ii) a user-interaction parameter indicative of whether an associated recipient of the plurality of users agrees with the respective spam prediction parameter. The server is configured to cluster the plurality of emails into at least two clusters. Each one of the at least two clusters has a respective subset of emails. The server is configured to for a given cluster from the at least two clusters, determine a respective ground truth parameter for the given cluster by analyzing the respective subset of emails and the associated user-interaction parameters. The respective ground truth parameter is one of the spam email and the non-spam email. The server is configured to for the given cluster from the at least two clusters, assign the respective ground truth parameter to the given cluster and each of the respective subset of emails contained therein. The server is configured to, for a given email from the given cluster, generate the spam prediction error parameter based on a difference between the spam prediction parameter and the respective ground truth parameter. The server is configured to, for the given email from the given cluster, store the spam prediction error parameter in association with the given email from the given cluster.

In some embodiments of the server, the server is further configured to determine the user-interaction parameter based on at least one user interaction between the associated recipient and a respective email from the plurality of emails. The at least one user interaction having been collected from an email interface displayed to the associated recipient.

In some embodiments of the server, the user interaction is at least one of (i) moving the respective email into a folder of the email interface, and (ii) clicking a pre-determined button of the email interface.

In some embodiments of the server, the clustering the plurality of emails is executed by the server based on email features similarity.

In some embodiments of the server, the clustering is executed by the server using a K-Nearest Neighbor (KNN) algorithm.

In some embodiments of the server, the server further executes the email application.

In some embodiments of the server, the server is configured to connect to a mail server executing the email application.

In some embodiments of the server, the indication of the plurality of emails comprises the plurality of emails.

In some embodiments of the server, the indication of the plurality of emails comprises an embedding of each of the plurality of emails, the embedding indicative of a content of the plurality of emails and devoid of any identifiers of associated recipients.

In some embodiments of the server, the server is further configured to analyze a total number of emails in a given subset of emails of an other given cluster from the at least two clusters, and in response to the number being below a pre-determined threshold, exclude the other given cluster from further analysis.

In some embodiments of the server, the server is further configured to retrain the spam detection algorithm by using the spam prediction error parameter.

In some embodiments of the server, a given one of the at least two clusters comprises at least two sub-clusters.

In some embodiments of the server, the given one plurality of emails is clustered in both the given one of the at least two clusters and one of the at least two sub-clusters.

In some embodiments of the server, in response to the given one of the plurality of emails being associated with the ground truth parameter indicative of a wrong categorization in one of the given one of the at least two clusters and one of the at least two sub-clusters, a same value is used for the ground truth parameter for the given one plurality of emails.

In some embodiments of the server, the ground truth parameter is independently assigned to the given one of the plurality of emails in one of the given one of the at least two clusters and one of the at least two sub-clusters.

In the context of the present specification, a "server" is a computer program that is running on appropriate hardware and is capable of receiving requests (e.g. from electronic devices) over the network, and carrying out those requests, or causing those requests to be carried out. The hardware may be one physical computer or one physical computer system, but neither is required to be the case with respect to the present technology. In the present context, the use of the expression a "at least one server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, unless provided expressly otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
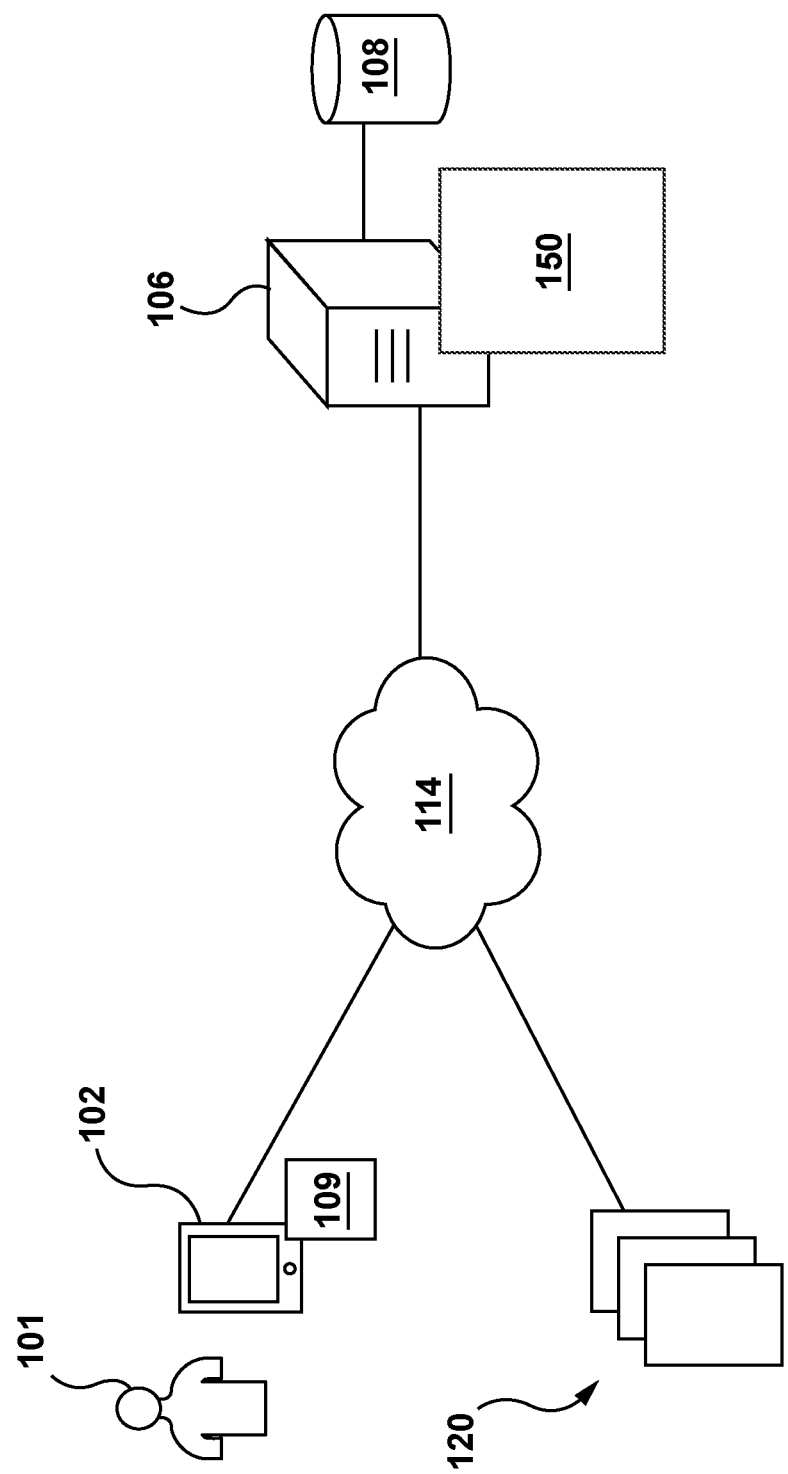
FIG. 1 is a schematic diagram depicting a system, the system being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

Electronic Device

The system 100 comprises an electronic device 102. The electronic device 102 is associated with a user 101 and, as such, can sometimes be referred to as a "client device". It should be noted that the fact that the electronic device 102 is associated with the user does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 may comprise a permanent storage (not depicted) in a form of one or more storage media and generally provides a place to store computer-executable instructions executable by a processor (not depicted). By way of example, the permanent storage may be implemented as a computer-readable storage medium including Read-Only Memory (ROM), hard disk drives (HDDs), solid-state drives (SSDs), and flash-memory cards.

The electronic device 102 comprises hardware and/or software and/or firmware (or a combination thereof), as is known in the art to execute a browser application 104. Generally speaking, the purpose of the browser application 104 is to enable the user 101 to access one or more web resources. The manner in which the browser application 108 is implemented is known in the art and will not be described herein. Suffice to say that the browser application 104 may be one of Google™ Chrome™, Yandex.Browser™, or other commercial or proprietary browsers.

Irrespective of how the browser application 104 is implemented, the browser application 104, typically, has a command interface (not depicted) and a browsing interface (not depicted). Generally speaking, the user 101 can access a given web resource by entering an address of the web resource (typically an URL or Universal Resource Locator, such as www.example.com) into the command interface, or by clicking a link in an email or in another web resource for being redirected to the given web resource, and in turn, content of the given web resource may be displayed in the browsing interface for the user 101.

Alternatively, the given user 101 may conduct a search using a search engine service (not depicted) to locate a resource of interest based on the user's search intent. The latter is particularly suitable in those circumstances, where the given user knows a topic of interest, but does not know the URL of the web resource she is interested in. The search engine typically returns a Search Engine Result Page (SERP) containing links to one or more web resources that are responsive to the user query. Again, upon the user clicking one or more links provided within the SERP, the user can open the required web resource.

In some embodiments of the present technology, the user 101 may make use of the browser application 104 for accessing an email application 150. Generally speaking, the email application 150 refers to one or more computer-implemented algorithms that enable the server 106 to provide email services for the user 101 of the electronic device 102. For example, the user 101 may have an email account associated with the email application 150. The user 101 may enter a URL associated with the email application 150 in the command interface of the browser application 104 and may access her email account with the email application 150.

In some embodiments of the present technology in addition to, or instead of, the electronic device 104 may be configured to execute a device-side email application (not depicted) associated with the (server-side) email application 150. Broadly speaking, the purpose of the device-side email application is to enable the user 101 to: browse a list of emails (both unread and read), read emails, open attachments, compose new emails, reply to emails, forward emails, delete emails, manage junk emails, assign categories to emails, organize emails into folders, create and access an address book and the like.

Irrespective of whether the user 101 makes use of the browsing application 104 and/or the device-side email application for accessing her email account, it is contemplated that the user 101 may be provided with an email interface (not depicted) for performing one or more actions on emails in her email account. The functionality of the email application 150 will be described in greater details herein further below.

Email Interface

Generally speaking, the purpose of the email interface is to allow user interactivity between a given user of the email application 150 (such as the user 101, for example) and emails in her email account. In one non-limiting example, the email interface may comprise one or more bars, one or more menus, one or more buttons, and may also enable other functionalities for allowing user interactivity with emails. It should be noted that a variety of email interfaces may be envisioned in the context of the present technology.

For example, the email interface may comprise a side bar indicative of one or more email folders (pre-determined and/or personalized) associated with a given email account such as, but not limited to: "inbox" folder, "outbox" folder, "drafts" folder, "junk" or "spam" folder, "deleted" folder, and the like. In another example, the email interface may comprise one or more buttons for performing various actions on emails such as, but not limited to: a "compose" button for composing a new email, a "send" button for sending a given email, a "save" button for saving a current version of a given email, a "read" button for indicating that a given email has been read or viewed by a given user, a "unread" button for indicating that a given email is unread or unviewed by a given user, a "spam" or "junk" button for indicating that a given email is to be categorized as a spam email and/or for indicating that the given email is to be transferred/moved to the "spam" folder, a "deleted" button for indicating that a given email is to be deleted and/or that the given email is to be transferred/moved to the "deleted" folder, and the like. In yet another example, the email interface may allow for other types of user interactivity with emails such as, but not limited to, "drag and drop" functionality for a given user to be able to select a given email from a first folder and to transfer/move the given email into a second folder in a seamless manner.

As it will become apparent from the description herein below, user-interactivity data may be generated and collected when a given user of the email application 150 performs one or more actions on her email(s) via the email interface.

Communication Network

The electronic device 102 comprises a communication interface (not depicted) for two-way communication with a communication network 114 via a communication link (not numbered). In some non-limiting embodiments of the present technology, the communication network 114 can be implemented as the Internet. In other embodiments of the present technology, the communication network 114 can be implemented differently, such as any wide-area communication network, local area communications network, a private communications network and the like.

How the communication link is implemented is not particularly limited and depends on how the electronic device 102 is implemented. Merely as an example and not as a limitation, in those embodiments of the present technology where the electronic device 102 is implemented as a wireless communication device (such as a smart phone), the communication link can be implemented as a wireless communication link (such as, but not limited to, a 3G communications network link, a 4G communications network link, a Wireless Fidelity, or WiFi®, for short, Bluetooth®, or the like) or wired (such as an Ethernet based connection).

It should be expressly understood that implementations for the electronic device 102, the communication link and the communication network 114 are provided for illustration purposes only. As such, those skilled in the art will easily appreciate other specific implementational details for the electronic device 102, the communication link and the communication network 114. As such, by no means the examples provided hereinabove are meant to limit the scope of the present technology.

Web Servers

The system 100 further includes a plurality of web servers 120 coupled to the communication network 114. A given one of the plurality of web servers 120 can be implemented as a conventional computer server. In an example of an embodiment of the present technology, the given web server can be implemented as a Dell™ PowerEdge™ Server running the Microsoft™ Windows Server™ operating system. Needless to say, the given web server can be implemented in any other suitable hardware and/or software and/or firmware or a combination thereof.

In some embodiments of the present technology, and generally speaking, the plurality of web servers 120 function as repositories for web resources. In the context of the present specification, the term "web resource" refers to any network resource (such as a web page, web site), which its content is presentable visually by the electronic device 102 to the user, via the browser application 104, and associated with a particular web address (such as a URL).

A given web resource hosted by one or more of the plurality of web servers 210 may be accessible by the electronic device 102 via the communication network 114, for example, by means of the user typing in the URL in the browser application 104 or executing a web search using the search engine (not depicted). Needless to say, in some cases, a given web server amongst the plurality of web servers 120 may host one or more web resources, while in other cases, a given web resource may be hosted by one or more web servers amongst the plurality of web servers 120.

As it will become apparent from the description herein further below, one or more of the plurality of web servers 120 may be configured to host other server-side email applications. In one non-limiting example, the one or more of the plurality of web servers 120 may be under control of one or more email service providers.

Server

The system 100 further includes a server 106 coupled to the communication network 114. The server 106 can be implemented as a conventional computer server. In an example of an embodiment of the present technology, the server 106 can be implemented as a Dell' PowerEdge™ Server running the Microsoft™ Windows Server™ operating system. Needless to say, the server 106 can be implemented in any other suitable hardware and/or software and/or firmware or a combination thereof. In the depicted non-limiting embodiment of the present technology, the server 106 is a single server. In alternative non-limiting embodiments of the present technology, the functionality of the server 106 may be distributed and may be implemented via multiple servers.

The implementation of the server 106 is well known. However, briefly speaking, the server 106 comprises a communication interface (not depicted) structured and configured to communicate with various entities (such as the electronic device 102 and other devices potentially coupled to the communication network 114) via the communication network 114.

Similar to the electronic device 102, the server 106 comprises one or more storage media and generally provides a place to store computer-executable program instructions executable by one or more processors (not depicted) of the server 106. By way of example, the one or more storage media may be implemented as tangible computer-readable storage medium including Read-Only Memory (ROM) and/ or Random-Access Memory (RAM) and may also include one or more fixed storage devices in the form of, by way of example, hard disk drives (HDDs), solid-state drives (SSDs), and flash-memory cards.

In some embodiments, the server 106 can be operated by the same entity that has provided the afore-described browser application 104 and/or the afore-described device-side email application. For example, if the browser application 104 is a Yandex.Browser™, the server 106 can be operated by Yandex LLC of Lev Tolstoy Street, No. 16, Moscow, 119021, Russia. In another example, if the device-side email application is Yandex.Mail™, the server 106 may also be operated by Yandex LLC. In alternative embodiments, the server 106 can be operated by an entity different from the one who has provided the aforementioned browser application 104.

In accordance with non-limiting embodiments of the present technology, the server 106 may be configured to host the (server-side) email application 150. As mentioned above, the purpose of the email application 150 is to provide email services to one or more users (including the user 101) associated with email accounts of the email application 150. It should be noted that the server 106 may be under control of an email service provider.

Again, the email application 150 may be accessible by the electronic device 102 by entering the associated URL (such as mail.yandex.ru, or the like) into the command interface of the browser application 104 (or clicking a hyperlink associated therewith) and/or by executing the afore-mentioned device-side email application. Once the email application 150 is accessed, the electronic device 102 may be configured to display the email interface to the user 101 for enabling user interactivity between the user 101 and emails in her email account. In some embodiments of the present technology, the user 101 may need to "log in" to her email account for being displayed with the email interface.

In at least some embodiments of the present technology, the server 106 hosting the email application 150 may act as an email transfer agent and, therefore, may be configured to transfer emails to and from the senders of e-mails and recipients of emails (such as the user 101 of the electronic device 102, for example). How the email application 150 can be used for providing email services will be described in greater details herein further below with reference to FIG. 2.

Database

The server 106 has access to a database 108. Broadly speaking, the email application 150 may make use of the database 108 for providing email services to its users. For example, the server 106 may be configured to maintain, within the database 108, emails destined for the user 101 associated with the electronic device 102. It should be noted that to the extent that the user 101 of the electronic device 102 has a pending email destined for her (in a sense that the user accesses her email interface for the purposes of checking emails destined to her), the user 101 can be thought of as an email recipient in the sense that she is the intended recipient of the pending email.

It is contemplated that the server 106 may be configured to access the database 108 to retrieve emails destined for the user 101 of the electronic device 102, for example, based on at least the destination email address associated with the user 101 of the electronic device 102 by matching it to the destination addresses stored within the "To" field of the plurality of emails stored at the database 108.

In some embodiments, the database 108 may be configured to store, in association with emails, an indication of some or all of the aforementioned message fields. In some embodiments, database 108 can also maintain the following information about the emails: receipt date, read date, user ID, time zone of the e-mail message recipient, action the user has taken in association with the e-mail message (if any), the type of electronic device on which such action was executed, platform of such electronic device and/or its operating system, sequential number of the emails within the inbox, socio-demographic information about the user and the like.

The database 108 may also store behavioral data associated with interactions of users of the email application 150 with emails destined to or originated from the users of the e-mail application 150. In some embodiments, the behavioral data may be stored in the database 108 in association with respective email accounts. For example, the database 108 may store a list of email categories and/or folders (pre-determined and/or personalized) associated with a given email account of the email application 150, such as but not limited to: "personal correspondence", "financial", "advertising", "spam", "others" and the like. Needless to say, the examples provided herein are meant to be non-limiting and non-exhaustive and other categories (as well as number of pre-set categories) can be used. In another example, behavioral data may include data indicative of user-interactivity between a given user and her emails and may be stored in the database 108 in association with the respective email account.

Server-Side Email Application

The functionality of the email application 150 will now be described with reference to FIG. 2. There is depicted a representation 200 of how the server 106 hosting the email application 150 may be configured to process a plurality of emails 210.

Figure 2:
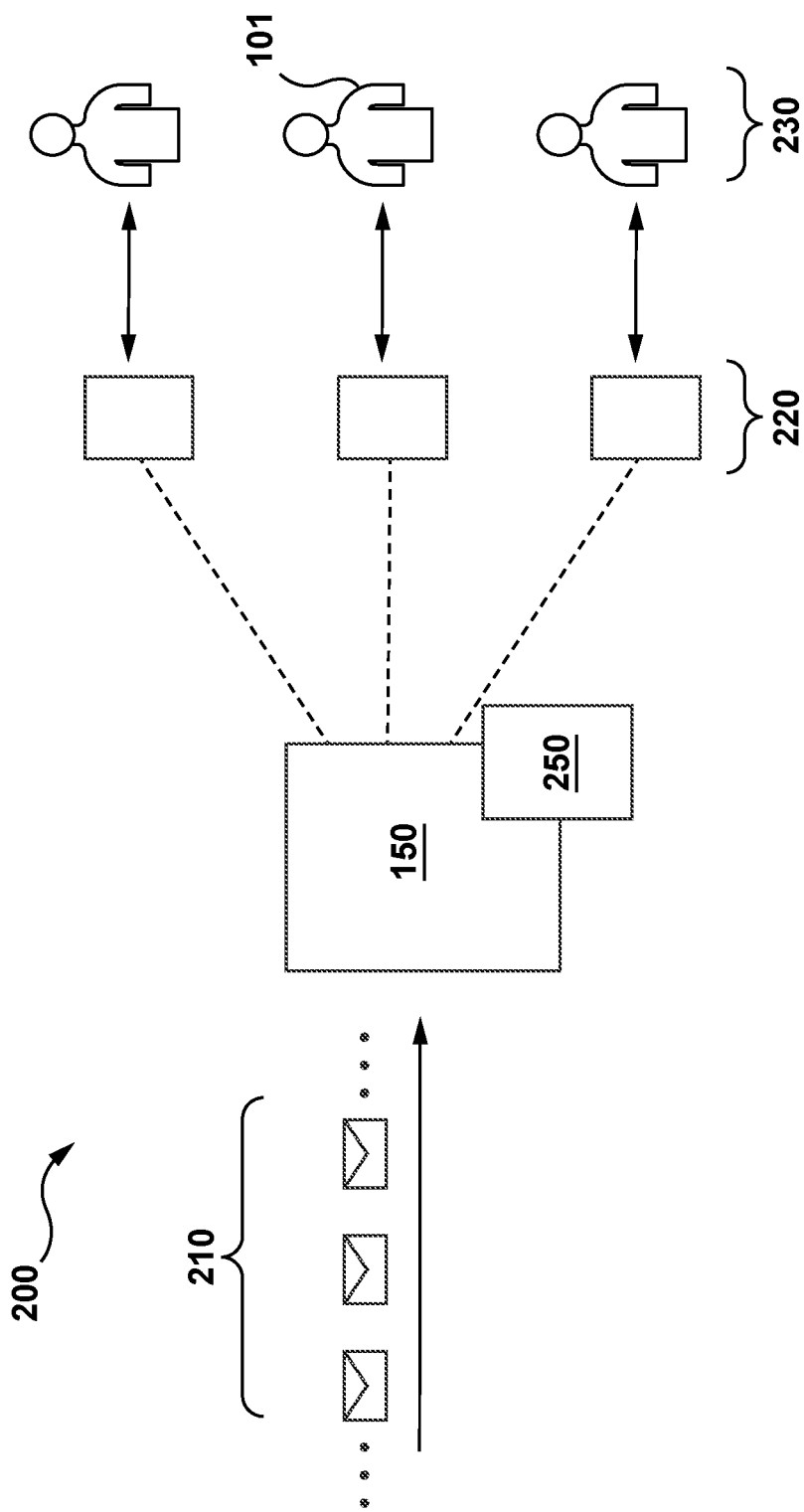
FIG. 2 depicts a schematic representation of operation of an email application of FIG. 1 including a spam detection algorithm, in accordance with non-limiting embodiments of the present technology.

As depicted in FIG. 2, the email application 150 hosts a plurality of email accounts 220 and where each one of the plurality of email accounts 220 is respectively associated with a unique email address. For example, a plurality of users 230 (including the user 101) may have respective one or more email accounts with the email application 150 for, generally speaking, receiving, sending, and storing emails. As such, the plurality of emails 210 may be received by the server 106 from one or more email senders and the server 106 is configured to inter alia provide the plurality of emails to the plurality of email accounts 220. It should be noted that in at least some embodiments of the present technology, email senders may include users from the plurality of users 230 of the email application 150. Needless to say, the server 106 may also be configured to send emails from the plurality of email accounts 220 of the email application 150 to respective recipient addresses of those emails.

It should be noted that a given email from the plurality of emails 210 received by the server 106 may comprise header data and content data. Broadly speaking, header data is used for email transfer purposes and generally includes information identifying the subject, sender and recipient of a given email. For example, header data may comprise information about (i) the sender's email address associated with a "From" field of the given email, (ii) recipient email address(es) associated with a "To" field, "Cc" field and/or "Bcc" field of the given email, (iii) the title associated with the "Subject" field of the given email, (iv) and the like.

The content data of a given email generally includes content that the sender wishes to provide to the recipient(s) via the given email. For example, the content data of the given email may comprise information about the body of the given email, and one or more files (if any) attached to the given email such as web pages, audio files, video files, image files, text files, and HTML, markup. Needless to say, the given email may comprise additional data in addition to header data and content data (such as email metadata, for example), without departing from the scope of the present technology.

When a given email from the plurality of emails 210 is received by the server 106, the server 106 may be configured to process the header data of the given email and determine which email account of the email application 150 is associated with the recipient address in the header data of the given email. The server 106 may thus determine which email of the plurality emails 210 is to be provided to which email account amongst the plurality of email accounts 220.

For example, assuming that the recipient address from the header data of the given email matches the email address of the email account associated with the user 101, the server 106 may store the given email in the database 108 in association with the inbox folder of that email account. As a result, when the user 101 accesses her email account, the email interface will be indicative of that that the inbox folder includes the given email.

Needless to say, the user 101 may use the email interface to interact with the given email. For example, the user 101 may decide to "read" the given email. In some cases, the user 101 may implicitly "read" the given email by opening the given email to see the content thereof. In other cases, the user 101 may explicitly "read" the given email by actuating the "read" button on the email interface. In another example, the user 101 may decide to "delete" the given email. In some cases, the user 101 may implicitly "delete" the given email by dragging and dropping the given email from the inbox folder into the "deleted" folder or "trash" folder. In other cases, the user 101 may explicitly "delete" the given email by actuating the "delete" or "trash" button on the email interface. In a further example, the user 101 may decide that the given email is spam. In some cases, the user 101 may implicitly categorize the given email as a spam email by dragging and dropping the given email from the inbox folder into the "spam" folder or "trash" folder. In other cases, the user may explicitly categorize the given email as a spam email by actuating the "spam" or "junk" button on the email interface.

In at least some embodiments of the present technology, it is contemplated that implicit and/or explicit user interactions between the given email and the user 101 may be collected and stored in the database 108 in association with the given email. It should be noted that the above examples of implicit and explicit user interactions between the given email and the user 101 are non-exhaustive and that data indicative of other user interactions may similarly be collected by the server 106 and stored in the database 108 in association with the given email.

As it will become apparent from the description herein further below, developers of the present technology have devised methods and systems that allow leveraging user-interactivity data between users and emails for ameliorating email categorization performance of the email application 150. In at least some embodiments of the present technology, the methods and systems described herein allow leveraging user-interactivity data between users and emails for ameliorating spam detection performance of the email application 150.

Spam Detection

In the context of the present technology, "spam emails" (or also known as "junk emails") refer to unsolicited emails received by users of a given email service. Spam emails are often sent in bulk to a large number of recipients. Sending indiscriminately unsolicited emails to a large number of recipients may sometimes be referred to in the art as "spamming".

It should be noted that although many spam emails are commercial in nature, others may contain links to malware-hosting web resources. Spam also prevents users from making full and good use of their time which is detrimental to user satisfaction with the email service. Spam is also responsible for untold financial loss to many users who have fallen victim of internet scams and other fraudulent practices of spammers who send spam emails pretending to be from reputable companies with the intention to persuade individuals to disclose sensitive personal information like passwords, and credit card numbers.

Moreover, spam emails place a burden on the email service providers by occupying a considerable amount of storage capacity and network bandwidth. The huge volume of spam emails flowing through computer networks have negative effects on inter alia the memory space of email servers, communication bandwidth, and CPU power. Spam emails account for a considerable portion of daily internet email traffic. In some cases, spamming can be used for "email bombing" of a recipient's inbox by sending a large amount of emails to a target recipient's address. In other cases, spamming can be used for performing "Denial-Of-Service" (DoS) attacks on servers hosting email services.

In order to mitigate risks associated with spam emails, the email application 150 of the server 106 is configured to execute a spam detection algorithm 250. Broadly speaking, the purpose of spam detection algorithms (sometimes referred to as "spam filtering algorithms") is to detect potential spam emails and to perform one or more actions thereon, such as filtering out the given email and/or flagging the given email as spam for a recipient thereof.

In at least some non-limiting embodiments of the present technology, the spam prediction algorithm 250 may be implemented as one or more Machine Learning Algorithms (MLAs). Generally speaking, MLAs can learn from and make predictions on data. MLAs are usually used to first build a model based on training inputs of data in order to then make data-driven predictions or decisions expressed as outputs, rather than following static computer-readable instructions. In some cases, different types of MLAs having different structures or topologies may be used in combination and may form at least a part of the spam detection algorithm 250.

In one non-limiting example, the spam detection algorithm 250 may comprise a Neural Network (NN). Generally speaking, a given NN consists of an interconnected group of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus rather than try to determine a complex statistical arrangements or mathematical algorithms for a given situation; the given NN tries to provide an "intuitive" answer based on a "feeling" for a situation. The given NN is thus a kind of a trained "black box", which can be used in a situation when what is in the "box" is unimportant; it is only important that the "box" provide reasonable answers to given inputs. NNs are commonly used in many such situations where it is only important to know an output based on a given input, but exactly how that output is derived is of lesser importance or is unimportant.

Therefore, it can be said that in at least some embodiments of the present technology, the spam detection algorithm 250 may be a NN-based spam detection algorithm. For example, the spam detection algorithm 250 may comprise Multilayer Perceptron Neural Networks (MLPNNs). In another example, the spam detection algorithm 250 may comprise Radial Base Function Neural Networks (RBFNN).

In some cases, in addition to or instead of encompassing one or more NNs, the spam detection algorithm 250 may comprise a Support Vector Machine (SVM). Broadly speaking, SVMs are supervised learning models that may analyze data and identify patterns used for categorisation and exploring the relationship between variables of interest, and as such are well suited for spam classification tasks. In other cases, the spam detection algorithm 250 may also comprise other types of MLAs such as Decision Trees (DTs), Naïve Bayes (NBs), and/or Evolutionary Algorithms (EAs) with stochastic optimization techniques for performing spam classification tasks.

To summarize, the implementation of a given MLA can be broadly categorized into two phases—a training phase and an in-use phase. First, the given MLA is trained in the training phase. Then, once the given MLA knows what data to expect as inputs and what data to provide as outputs, the given MLA is actually run using in-use data in the in-use phase.

How different types of MLAs can be first trained and then used for performing spam filtering tasks, in at least some embodiments of the present technology, is described in an article entitled "Machine learning for email spam filtering: review, approaches and open research problems", published on Jun. 11, 2019, the content of which is incorporated herein by reference in its entirety.

In some embodiments of the present technology, the spam detection algorithm 250 may be configured to apply one or more content-based filtering techniques on emails received by the server 106. Usually, content-based filtering is used to create automatic filtering rules and to classify or categorize emails using machine learning approaches with NBs, SVMs, NNs, and the like. For example, such methods may be used for analyzing words, the occurrence, and distributions of characters, words, and phrases in the content of emails (content data) for training the spam detection algorithm 250 to in a sense, "learn" relationships and/or patterns in the email content that are indicative of spam and, once so-trained, the spam detection algorithm 250 may analyze the content of a given email for determining whether or not the given email is spam.

In other embodiments, the spam detection algorithm 250 may be configured to apply one or more sample-base spam filtering techniques. Firstly, emails (both non-spam and spam emails) are extracted from email accounts using a collection model. Subsequently, processing steps are carried out to, in a sense, "transform" the email into a vector representative of a given email by using feature extraction, and selection, grouping of email data, and the like. The vectors are then classified into two vector sets (vectors representative of spam emails and vectors representative of non-spam emails). Lastly, the spam detection algorithm 250 is trained on so-generated vectors and corresponding labels (indicative of whether respective vectors are associated with spam or non-spam) for then being used to determine whether a given email is spam or non-spam.

In further embodiments, the spam detection algorithm 250 may be configured to apply one or more heuristic or rule-based spam filtering techniques. Typically, such techniques use pre-determined rules or heuristics to determine presence of spam-indicative patterns in a given email. For example, an email may be rated by a given spam score and, the more spam-indicative patterns are found in the given email, the higher the spam score. Emails associated with spam scores that surpass a pre-determined threshold may be identified as spam. While some rules and heuristics do not change over time, others require constant updating to be able to cope effectively with the menace of spammers who continuously introduce new spam emails that can potentially circumvent existing heuristic or rule-based spam filtering techniques.

In yet additional embodiments, the spam detection algorithm 250 may be configured to apply one or more history-based spam filtering techniques. Such techniques may require the use of memory-based, or instance-based, machine learning methods to classify emails based to their resemblance to stored examples (e.g. training emails). For example, features of a given email may be used to create a multi-dimensional space vector, which is then used to plot new instances (new emails) as points. The new instances are afterward allocated to the most popular class of its K-closest training instances. In these embodiments, the span detection algorithm 250 may employ K-Nearest Neighbor (KNN) techniques for filtering spam emails.

In some embodiments of the present technology, the spam detection algorithm 250 may be configured to apply one or more adaptive spam filtering techniques. Such spam filtering methods may detect and filter spam emails by grouping them into different classes or categories. It divides an email corpus into various groups and comparison is made between emails and each group, and a similarity score may be used to determine to which group a given email belongs to.

In at least some embodiments of the present technology, it is contemplated that the spam detection algorithm 250 may be embodied as one or more MLAs and may be configured to detect and filter spam emails by applying one or more of content-based filtering techniques, sample-base spam filtering techniques, heuristic or rule-based spam filtering techniques, history-based spam filtering techniques, and adaptive spam filtering techniques. It should be noted that different emails service providers may use different spam detection algorithms, and that type(s) of MLAs and spam filtering technique(s) used by the spam detection algorithm 250 may depend on a specific implementation of the present technology.

Nevertheless, it should be noted that spam detection algorithms can sometimes erroneously classify a given non-spam email as spam or otherwise erroneously classify a given spam email as non-spam. In some cases, spam detection algorithms can also include computer-implemented mechanisms that are used to determine a risk level of emails. Non-limiting examples of such mechanisms include satisfactory spam limits, sender policy frameworks, whitelists and blacklists, and recipient verification tools. When the satisfactory spam threshold is too low, it can lead to more spam evading the spam filtration. Meanwhile having a relatively high threshold can lead to some important emails being isolated or classified as spam (unless the operator of the email service redirects them).

It should be noted that one approach to training or retraining MLAs is to have human assessors "assess" the predictions made by a given MLA for a given input and use this information for generating a new training example. In the case of spam detection algorithms, this may be less desirable in some situations as emails (their content) is confidential. As a result, it may be undesirable to employ crowdsourcing techniques for assessing spam predictions about emails. As it will become apparent from the description herein further below, developers of the present technology have devised methods and systems that may allow gathering information for retraining a given spam detection algorithm independently from and/or without human assessor intervention.

In at least some embodiments, developers of the present technology have devised methods and systems that allow leveraging erroneously classified emails (spam vs non-spam) for ameliorating future spam detection of the email application 150. In at least some embodiments of the present technology, training data may be generated based on erroneously classified emails for training (or re-training) the spam detection algorithm 250. Thus it can be said that data associated with erroneously classified emails may be used for adjusting the spam detection algorithm 250 and thereby increasing the future performance of the spam detection algorithm 250.

How erroneously classified emails are determined and what data associated with erroneously classified emails may be collected by the server 106 will now be described in greater details with reference to FIGS. 3 to 5.

Erroneous Email Classification (Spam Vs. Non-Spam)

Broadly speaking, the server 106 may be configured to determine erroneous email classification by (i) performing spam classification on emails received by the server 106 for determining respective "spam prediction" parameters, (ii) performing a clustering procedure on emails received by the server 106, and (iii) using user-interactivity data and email cluster data for assigning a "ground truth" parameter to emails, and (iv) comparing the respective ground truth parameter against the respective spam prediction parameter for determining whether or not the given email has been erroneously classified as spam or non-spam.

Figure 3:
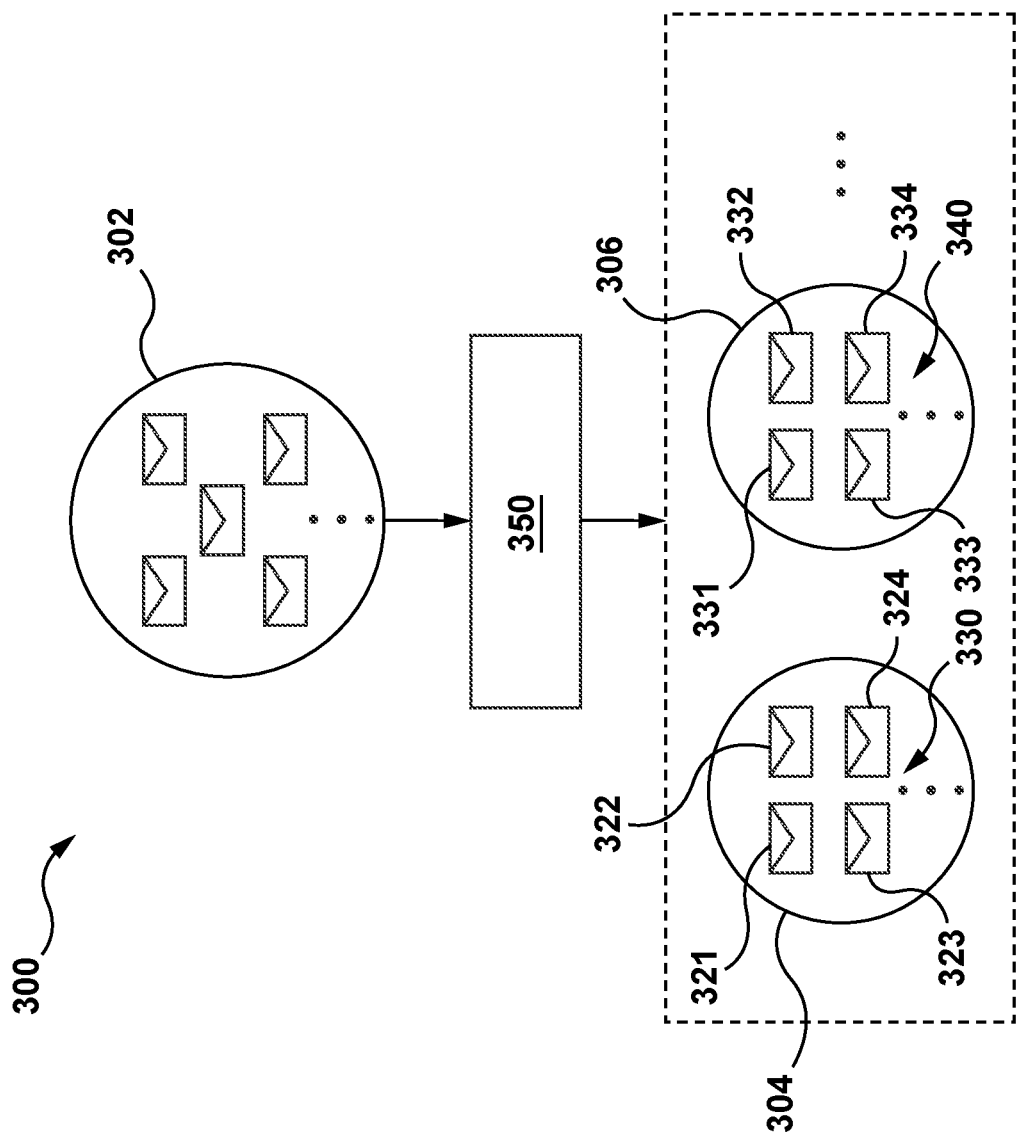
FIG. 3 depicts a schematic representation of an email clustering procedure performed by a server of the system of FIG. 1, in accordance with non-limiting embodiments of the present technology.

With reference to FIG. 3, there is depicted a representation 300 of how the server 106 may be configured to cluster emails that are received by the server 106. There is depicted a set of emails 302 containing emails received by the server 106. For example, the set of emails 302 may be generated based on the plurality of emails 210 that are received by the server 106.

The server 106 may execute an email clustering procedure 350 for clustering the set of emails 302 into clusters. For example, the server 106 may be configured to determine two clusters, namely a first cluster 304 and a second cluster 306. Generally speaking, the purpose of the clustering procedure 350 is to analyze the set of emails 302 and group them into "subsets" of emails based on their similarity.

In at least one embodiment, the server 106 may be configured to generate for emails respective feature vectors having features that are representative of the respective emails. The server 106 may then be configured to compare how "close" or "far" a feature vector of a first email is to a feature vector of a second email by computing the Euclidian distance, for example, between the two vectors. In such a case, the closer the two feature vectors, the more similar the first and the second emails are to each other. Also, the farther the two feature vectors, the less similar the first and the second emails are to each other.

In some embodiments, as part of the clustering procedure 350, the server 106 may be configured to execute a KNN algorithm for clustering the set of emails 302. For example, feature vectors associated with respective emails from the set of emails 302 may be mapped into a multidimensional space, and using the KNN algorithm, the server 106 may be configured to determine one or more groups of these feature vectors and accordingly group the respective emails into clusters.

It is contemplated that in some embodiments, the total number of clusters into which the set of emails 302 is to be grouped may be pre-determined (by an operator of the email application 150, for example). In other embodiments however, the total number of clusters may be apriori unknown.

As seen in the non-limiting example illustrated in FIG. 3, the first cluster 304 comprises a first subset of emails 320 from the set of emails 302 and the second cluster 306 comprises a second subset of emails 330 from the set of emails 302. More specifically, the first subset of emails 320 comprises inter alia emails 321, 322, 323, and 324, while the second subset of emails 330 comprises inter alia emails 331, 332, 333, and 334.

It is contemplated that the server 106 may be configured to store data indicative of the first cluster 304 and of the second cluster 306 in the database 108. In other words, the server 106 may be configured to store in the database 108 information indicative of the association between emails and respective first and second clusters 304, and 306.

Independently from the clustering procedure 350, as mentioned above, the server 106 may be configured to use the spam prediction algorithm 250 for generating for each email from the set of emails 302 a respective "spam prediction parameter" indicative of that the respective email from the set of emails 302 is one of a spam email and a non-spam email.

For example, if the spam prediction parameter for a given email is indicative of that the given email is non-spam, the given email may appear in the respective recipient's inbox folder. However, if the spam prediction parameter for the given email is indicative of that the given email is spam, the given email may appear in the respective recipient's spam folder and/or may be flagged as a spam email. Irrespective of any particular way of indicating to the recipient that the given email is spam or non-spam, it is contemplated that the email interface provided to the recipient may be configured to display an indication of the spam prediction parameter associated with the given email to the recipient.

In summary, it can be said that each email from the set of emails 302 may be associated with inter alia (i) a respective spam prediction parameter determined by the spam detection algorithm 250, and (ii) a respective cluster determined by the clustering procedure 350.

The server 106 may be configured to retrieve, from the database 108, user-interactivity data stored in association with respective emails from the first cluster 304 and the second cluster 306. Broadly speaking, the server 106 may be configured to retrieve user-interactivity data for generating for a given email a respective "user-interaction parameter" indicative of whether an associated recipient of the plurality of users agrees with the respective spam prediction parameter.

For example, if a given email appears in the recipient's inbox folder, the given email is associated with a respective spam prediction parameter indicative of that the given email is non-spam. The server 106 may be configured to analyze the user-interactivity data between the recipient and the given email for determining whether the recipient agrees with the respective spam prediction parameter. In this example, if user-interactivity data for that given email comprises an indication of that the recipient moved the given email from the inbox folder to a spam folder, and/or that the recipient clicked a "spam" button while selecting the given email, for example, the server 106 may determine that the recipient does not agree with the spam prediction parameter for that given email. Otherwise, the server 106 may determine that the recipient agrees with the respective spam prediction parameter.

In another example, if a given email appears in the recipient's spam folder, and/or if the given email is flagged as being spam, the given email is associated with a spam prediction parameter indicative of that the given email is spam. The server 106 may be configured to analyze the user-interactivity data between the recipient and the given email for determining whether the recipient agrees with the spam prediction parameter. In this example, if user-interactivity data for that given email comprises an indication of that the recipient moved the given email from the spam folder to the inbox folder, and/or that the recipient clicked a "non-spam" button while selecting the given email, the server 106 may determine that the recipient does not agree with the respective spam prediction parameter for that given email. Otherwise, the server 106 may determine that the recipient agrees with the respective spam prediction parameter.

For sake of clarity, it should be noted that many different user interactions may be analyzed by the server 106 for determining whether the recipient agrees with the spam prediction parameter of a given email. Therefore, irrespective of a particular user interaction being used by the server 106, it is contemplated that the server 106 may analyze user-interactivity data between a given email and a given user for determining the user-interaction parameter for the given email. In some embodiments, this analysis of user-interactivity data by the server 106 may be based on one or more pre-determined rules that may be used to (i) parse user interactions and (ii) interpret whether one or more of these user interactions are indicative of the user agreeing and/or disagreeing with the classification of the given email (spam vs. non-spam).

Therefore, it can be said that that user-interactivity data between a given email and an associated recipient may be indicative of either (i) that the associated recipient agrees with the classification (spam vs. non-spam) of the given email, or (ii) that the associated recipient disagrees with the classification of the given email. In some embodiments, in response to the absence of user-interactivity data indicative of that the associated recipient agrees with the classification of the given email, the server 106 may be configured to determine that the associated recipient disagrees with the classification of the given email. In other embodiments, in response to the absence of user-interactivity data indicative of that the associated recipient disagrees with the classification of the given email, the server 106 may be configured to determine that the associated recipient agrees with the classification of the given email.

Also, it is contemplated that the user interaction parameter being indicative of whether the associated recipient agrees with the spam prediction parameter may refer to one of (depending on the given email and the respective spam prediction parameter):

- the user interaction parameter being indicative of that the associated recipient agrees with that the given email is spam;
- the user interaction parameter being indicative of that the associated recipient agrees with that the given email is non-spam;
- the user interaction parameter being indicative of that the associated recipient disagrees with that the given email is spam; and
- the user interaction parameter being indicative of that the associated recipient disagrees with that the given email is non-spam.

In summary, it can be said that each email from the set of emails 302 may be associated with inter alia (i) a respective cluster, (ii) a respective spam prediction parameter, and (iii) a user-interaction parameter.

The server 106 is also configured to analyze a given cluster and user-interaction parameters of respective emails for determining a "ground truth parameter" for the given cluster. To better illustrate this, reference will now be made to FIG. 4. There is depicted the first subset of emails 320 (of the first cluster 304) associated with respective user-interaction parameters. For example, the emails 321, 322, 323, and 324 are respectively associated with user-interaction parameters 411, 412, 413, and 414. There is also depicted the second subset of email 330 (of the second cluster 306) associated with respective user-interaction parameters. For example, the emails 331, 332, 333, and 334 are respective associated with user-interaction parameters 411, 412, 413, and 414.

For example, in response to a majority of emails from the first subset of emails 320 being associated with respective user-interaction parameters that the respective recipients agreed with the respective emails being spam and/or disagreed that the respective emails are non-spam, the server 106 may assign to the first cluster 304 the ground-truth parameter indicative of that the first subset of emails 320 include spam emails.

In another example, in response to a majority of emails from the first subset of emails 320 is associated with respective user-interaction parameters that the respective recipients agreed with the respective emails being non-spam and/or disagreed that the respective emails are spam, the server 106 may assign to the first cluster 304 the ground-truth parameter indicative of that the first subset of emails 320 include non-spam emails.

In some embodiments, instead of using a "majority" threshold for assigning the ground truth parameter, other thresholds may be envisioned. For example, the server 106 may assign a ground truth parameter indicative of that a given cluster comprises spam emails to a given cluster if more than 75% of emails in that given cluster are associated with respective user-interaction parameters that are indicative of that the respective recipients agreed with the respective emails being spam and/or disagreed that the respective emails are non-spam. In another example, the server 106 may assign a ground truth parameter indicative of that a given cluster comprises non-spam emails to a given cluster if more than 75% of emails in that given cluster are associated with respective user-interaction parameters that are indicative of that the respective recipients agreed with the respective emails being non-spam and/or disagreeing that the respective emails are spam.

How the pre-determined threshold is determined is not particularly limited. In one case, the operator of the email application 150 may determine a given value to be used as the pre-determined threshold. However, different values may be used as the pre-determined threshold for specific implementations of the present technology.

Figure 4:
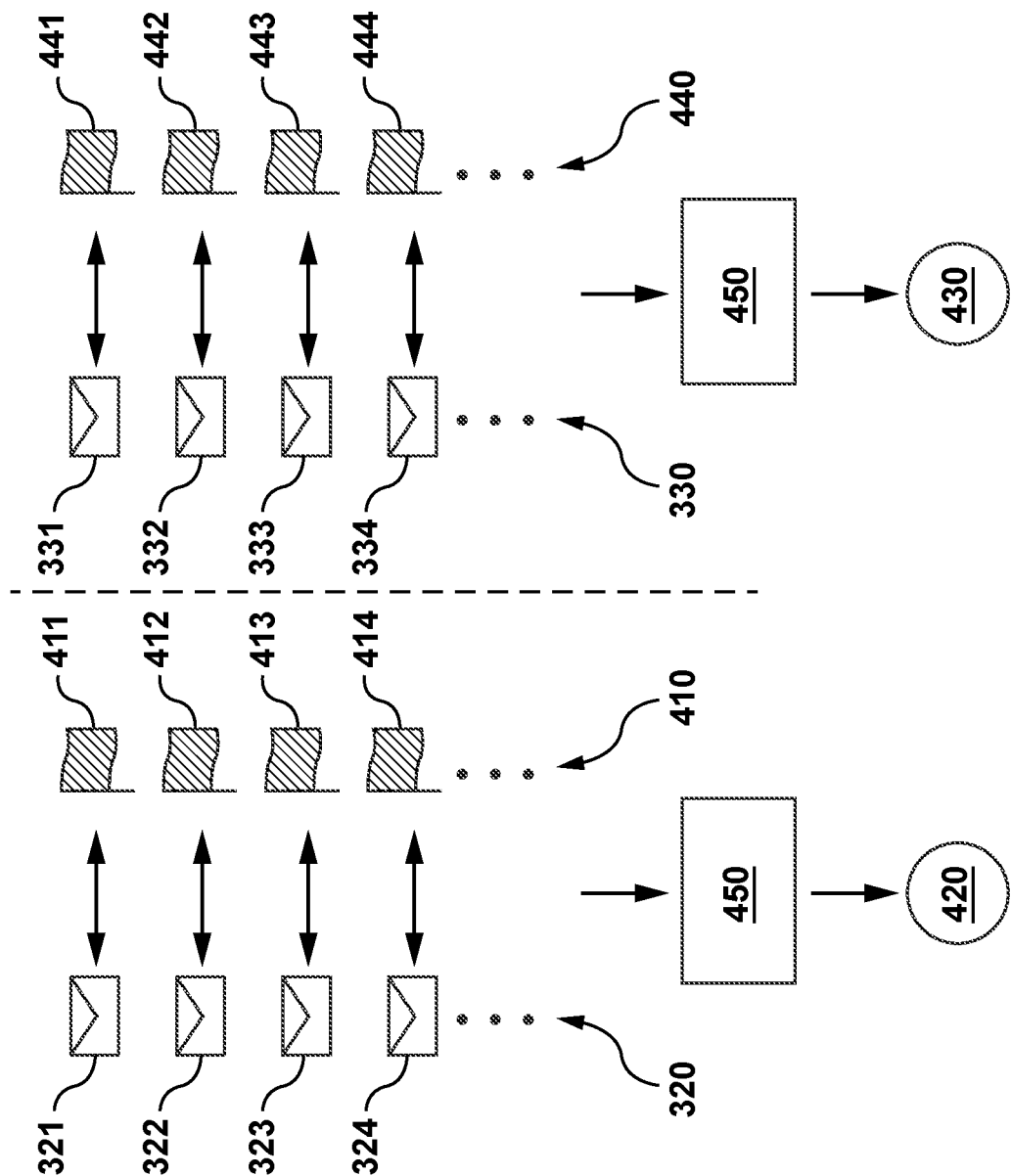
FIG. 4 depicts a schematic representation of how ground truth parameters are determined for respective clusters by the server of the system of FIG. 1, in accordance with non-limiting embodiments of the present technology.

Returning to description of FIG. 4, let it be assumed that the server 106 performs a first analysis 450 on a plurality of user-interaction parameters 410 and determines that 85% of emails in the first subset of emails 320 are associated with user-interaction parameters indicative of that the recipients agreed with the respective emails being spam and/or disagreed that the respective emails are non-spam. The server 106 may compare this value against the pre-determined threshold—in this case, the server 106 may determine that 85% is above the pre-determined threshold and determines a ground truth parameter 420 for the first cluster 304 indicative of that emails in the first subset of emails 320 are spam emails.

Also, let it be assumed that the server 106 performs a second analysis 460 on a plurality of UI parameters 440 and determines that 95% of emails in the second subset of emails 330 are associated with UI parameters indicative of that the recipients agreed with the respective emails being non-spam and/or disagreed that the respective emails are spam. The server 106 may compare this value against the pre-determined threshold—in this case, the server 106 may determine that 95% is above the pre-determined threshold and determines a ground truth parameter 430 for the second cluster 306 indicative of that emails in the second subset of emails 330 are non-spam emails.

In summary, it can be said that a given email in the first subset of emails 330 of the first cluster 304 is associated with (i) a respective spam prediction parameter determined by the spam prediction algorithm 250, (ii) a respective user-interaction parameter determined based on user-interactivity data between the given email and the associated recipient, and (iii) the ground truth parameter 420 of the first cluster 304.

Similarly, it can be said that a given email in the second subset of emails 340 of the second cluster 306 is associated with (i) a respective spam prediction parameter determined by the spam prediction algorithm 250, (ii) a respective user-interaction parameter determined based on user-interactivity data between the given email and the associated recipient, and (iii) the ground truth parameter 430 of the second cluster 306.

The server 106 is also configured to determine a "spam prediction error parameter" for emails in the first cluster 304 and/or the second cluster 306 based on the respective spam prediction parameters determined by the spam prediction algorithm 250 and the ground truth parameters 420 and 430, respectively. Broadly speaking, the server 106 may be configured to determine the spam prediction error parameter for a given email by determining whether or not the respective ground truth parameter confirms the respective spam prediction parameter. For example, the server 106 may be configured to determine the spam prediction error parameter for a given email based on a difference between the respective spam prediction parameter and the respective ground truth parameter.

Continuing with the previous example where the ground truth parameter 420 for the first cluster 304 is indicative of the emails in the first subset of emails 320 being spam emails, the server 106 may be configured to determine a spam prediction error parameter for the email 321 from the first cluster 304. Let it be assumed that, during classification (spam vs. non-spam) by the spam detection algorithm 250, the server 106 determines the spam prediction parameter for the email 321 being indicative of that the email 321 is a spam email. In this example, the server 106 may be configured to compare the (i) the spam prediction parameter for the email 321 indicative of that the email 321 is a spam email, against (ii) the ground truth parameter 420 indicative of that the email 321 (which is part of the first cluster 304) is a spam email. As such, in this example, the server 106 may be configured to determine that the spam prediction algorithm correctly classified the email 321 as being a spam email.

Continuing with the previous example where the ground truth parameter 420 for the first cluster 304 is indicative of the emails in the first subset of emails 320 being spam emails, the server 106 may be configured to determine a spam prediction error parameter for the email 322 from the first cluster 304. Let it be assumed that, during classification (spam vs. non-spam) by the spam detection algorithm 250, the server 106 determines the spam prediction parameter for the email 322 being indicative of that the email 322 is a non-spam email. In this example, the server 106 may be configured to compare the (i) the spam prediction parameter for the email 322 indicative of that the email 322 is a non-spam email, against (ii) the ground truth parameter 420 indicative of that the email 322 (which is part of the first cluster 304) is a spam email. As such, in this example, the server 106 may be configured to determine that the spam prediction algorithm erroneously classified the email 322 as being a non-spam email.

Continuing with the previous example where the ground truth parameter 430 for the second cluster 306 is indicative of the emails in the second subset of emails 330 being non-spam emails, the server 106 may be configured to determine a spam prediction error parameter for the email 331 from the second cluster 306. Let it be assumed that, during classification (spam vs. non-spam) by the spam detection algorithm 250, the server 106 determines the spam prediction parameter for the email 331 being indicative of that the email 331 is a non-spam email. In this example, the server 106 may be configured to compare the (i) the spam prediction parameter for the email 331 indicative of that the email 331 is a non-spam email, against (ii) the ground truth parameter 420 indicative of that the email 331 (which is part of the second cluster 306) is a non-spam email. As such, in this example, the server 106 may be configured to determine that the spam prediction algorithm correctly classified the email 331 as being a non-spam email.

Continuing with the previous example where the ground truth parameter 430 for the second cluster 306 is indicative of the emails in the second subset of emails 330 being non-spam emails, the server 106 may be configured to determine a spam prediction error parameter for the email 332 from the second cluster 306. Let it be assumed that, during classification (spam vs. non-spam) by the spam detection algorithm 250, the server 106 determines the spam prediction parameter for the email 332 being indicative of that the email 332 is a spam email. In this example, the server 106 may be configured to compare the (i) the spam prediction parameter for the email 332 indicative of that the email 332 is a spam email, against (ii) the ground truth parameter 420 indicative of that the email 332 (which is part of the second cluster 306) is a non-spam email. As such, in this example, the server 106 may be configured to determine that the spam prediction algorithm erroneously classified the email 332 as being a spam email.

Thus, it can be said that the server 106 may be configured to generate a spam prediction error parameter for a given email based on a difference between (i) the spam prediction parameter and (ii) the respective ground truth parameter. The server 106 may be configured to generate such a spam prediction error parameter for each email from the first cluster 304 and/or the second cluster 306. It should be noted that the spam prediction error parameter is indicative of whether the spam detection algorithm 250 correctly, or otherwise erroneously, classified a respective email if compared to "ground truth" information extracted from user interactions between emails (which are similar to the respective email) and their recipients.

The server 106 may also be configured to store emails in association with respective spam prediction error parameters in the database 108. In some embodiments, it is contemplated that the server 106 may be configured to adjust (train and/or re-train) the spam prediction algorithm 250 based on the spam prediction error parameters associated with respective emails.

In one non-limiting example, the server 106 may be configured to identify which emails are associated with respective spam prediction error parameters indicative of that the spam detection algorithm 250 erroneously classified the respective emails. So-identified emails may be used for generating additional training examples for the spam detection algorithm 250. For example, a given additional training example may include a feature vector representative of a given so-identified email and a label representative of the ground truth parameter associated with the so-identified email.

In some embodiments of the present technology, the server 106 executing the clustering procedure 350 may yield more than two clusters of emails. It is also contemplated that in other embodiments, the server 106 executing the clustering procedure 350 may yield cluster data with a "higher level of granularity" than what is depicted in FIG. 3. For example, one or more clusters yielded by the server 106 may comprise one or more sub-clusters of emails. Also, one or more sub-clusters may comprise one or more sub-sub-clusters of emails, and so forth.

Figure 5:
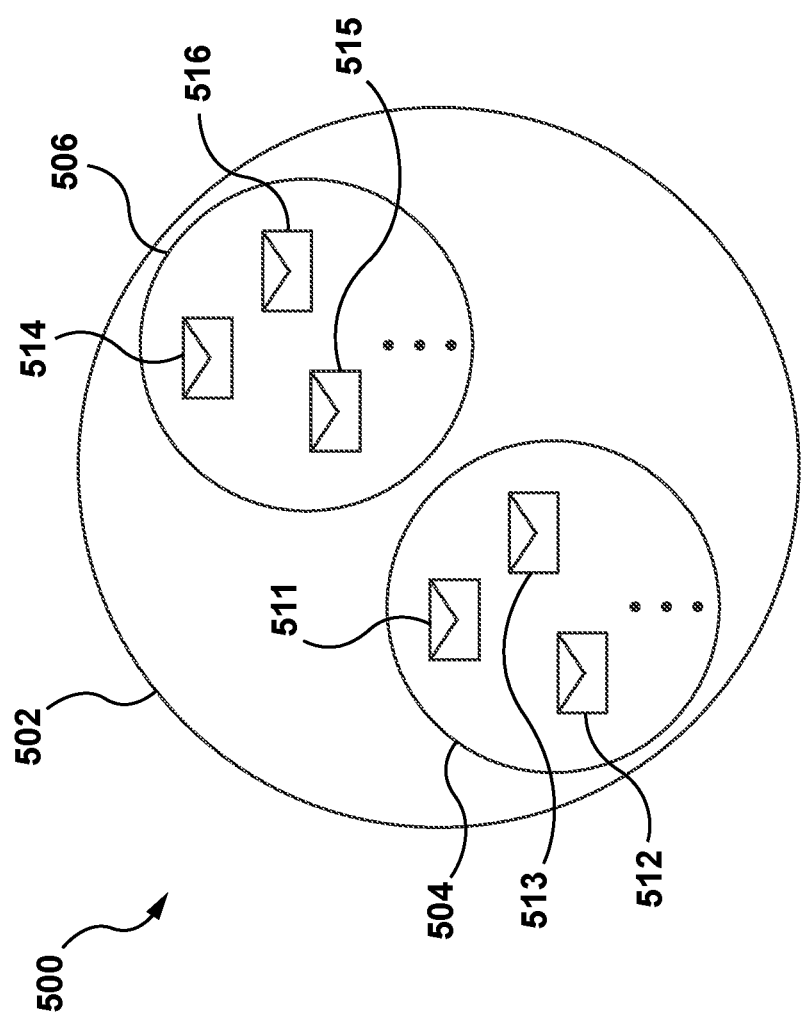
FIG. 5 depicts a schematic representation of a cluster structure output of the email clustering procedure of FIG. 3, in accordance with non-limiting embodiments of the present technology.

To better illustrate this, reference will now be made to FIG. 5 depicting a representation 500 of a cluster 502. For example, the server 106 may be configured to generate the cluster 502 (amongst other potential clusters of emails) similarly to what has been described above. In other words, the server 106 may determine that emails 511, 512, 513, 514, 515, and 516 are more similar to one another than other emails being clustered. It can be said that the cluster 502 may be part of a cluster structure output of the email clustering procedure 350 (see FIG. 3).

However, in addition to that, the cluster 502 comprises a first sub-cluster 504 and a second sub-cluster 506. The first sub-cluster 504 comprises the emails 511, 512, and 513, while the second sub-cluster 506 comprises the emails 514, 515, and 516. In other words, in addition to determining that emails 511, 512, 513, 514, 515, and 516 are more similar to one another than other emails being clustered, the emails 511, 512, and 513 are more similar to one another than to the emails 514, 515, and 516, and vice versa.

In this example, let it be assumed that the spam prediction parameter for the email 511 is indicative of that the email 511 is non-spam, and that the ground truth parameter for the cluster 502 is indicative of non-spam. In this case, when the server 106 compares the ground truth parameter of the cluster 502 (including the email 511) against the spam prediction parameter of the email 511, the server 106 may determine that the email 511 has been correctly classified by the spam prediction algorithm 250.

However, let it also be assumed that the server 106 determines a ground truth parameter for the first sub-cluster 504 (similarly to what has been described above, but based on the emails 511, 512, and 513 contained therein) that is indicative of spam. In such a case, the server 106 may further compare the ground truth parameter of the sub-cluster 504 (including the email 511) against the spam prediction parameter of the email 511. In this case, the server 106 may determine that the email 511 has been erroneously classified.

Therefore, it can be said that more than one ground truth parameters may be associated with a given email when the given email is part of more than one groups of emails (cluster, sub-cluster, sub-sub-cluster, and so forth). Also, each one of the more than one ground truth parameters for the given email may be independently assigned from one another and based on the emails contained within the respective more than one groups of emails. In such cases, the server 106 may be configured to determine a spam prediction error parameter for the given email based on the spam prediction parameter and at least one of the more than one ground truth parameters associated therewith. For example, if at least one of the more than one ground truth parameters associated with the given email does not match the respective spam prediction parameter, the server 106 may determine that the given email has been erroneously classified by the spam prediction algorithm 250 and may store the given email in association with the spam prediction error parameter indicative of that the given email has been erroneously classified.

Figure 6:
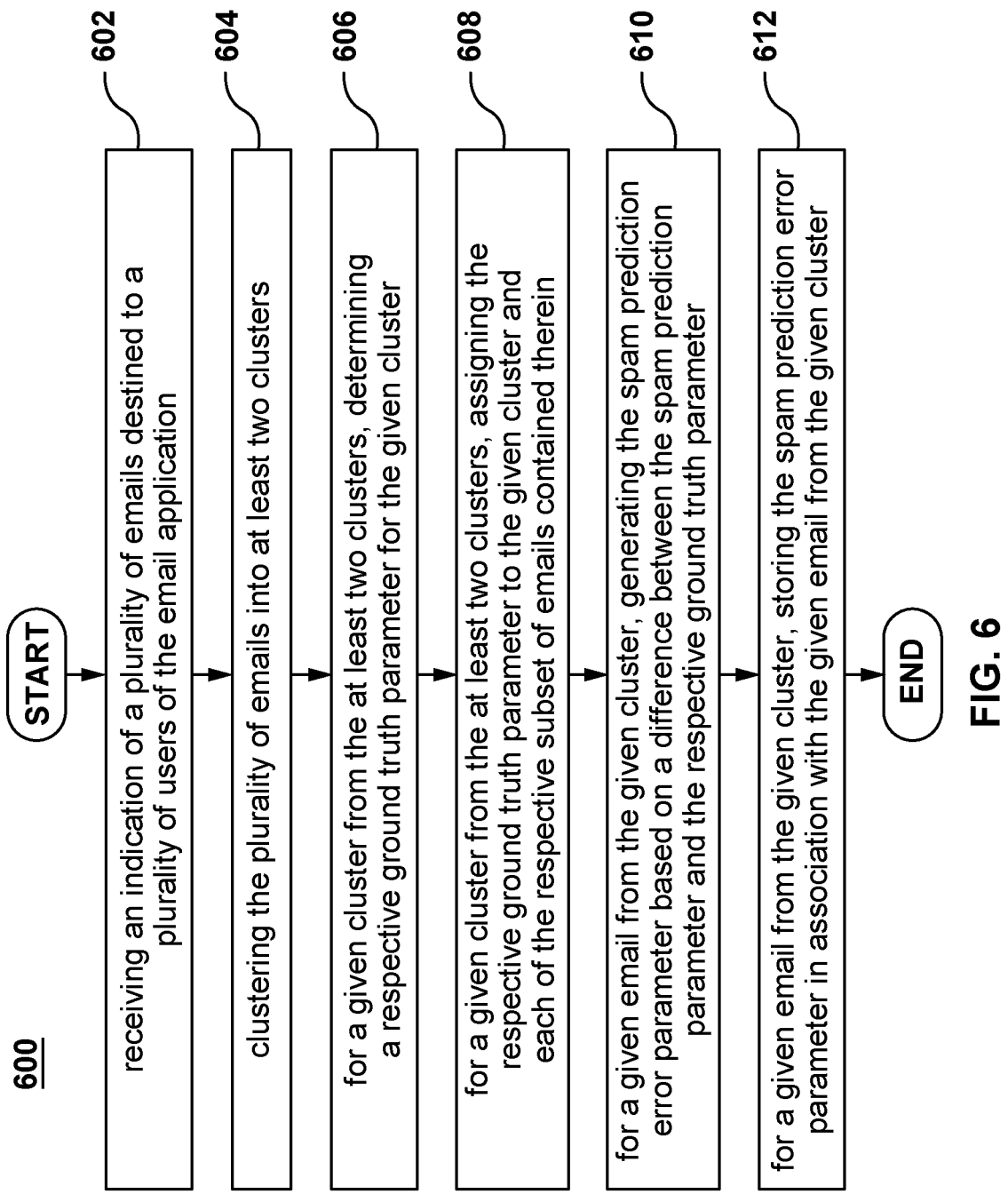
FIG. 6 depicts a flow chart of a method for determining a spam prediction error parameter, the method being executed in accordance with non-limiting embodiments of the present technology.

Given the architecture and examples provided herein above, it is possible to execute a computer-implemented method of determining a spam prediction error parameter. With reference to FIG. 6, there is depicted a flow chart of a method 600, the method 600 being executable in accordance with non-limiting embodiments of the present technology. The method 600 can be executed by the server 106 and/or an other server (not depicted) coupled to the server 106 hosting the email application 150.

STEP 602: Receiving an Indication of a Plurality of Emails Destined to a Plurality of Users of the Email Application The method 600 begins at step 602 with the server 106 configured to receive an indication of a given plurality of emails destined to a plurality of users of the email application 150. For example, the server 106 may be configured to receive an indication of the plurality of emails 210 and/or the set of emails 302.

It should be noted that in some embodiments, the indication of the plurality of emails 210 may comprise the plurality of emails 210. In other embodiments, the indication of the plurality of emails 210 may comprise an embedding of each of the plurality of emails 210 (e.g., emails in a vectorized form where a given vector is representative of a respective email). In such cases, this embedding may be indicative of a content of the plurality of emails 210 and devoid of any identifiers of associated recipients.

It should be noted that a given one of the plurality of emails 210 has a respective spam prediction parameter indicative of the spam detection algorithm 250 determining that the given one of the plurality of emails 210 is one of a spam email and a non-spam email a respective user-interaction parameter indicative of whether an associated recipient of the plurality of users agrees with the respective spam prediction parameter.

In some embodiments, the method 600 may further comprise the server 106 configured to determine the user-interaction parameter based on at least one user interaction between the associated recipient and the respective email from the plurality of emails 210. For example, the at least one user interaction may have been collected from an email interface displayed to the associated recipient. The user interaction may be at least one of (i) moving the respective email into a folder of the email interface, and (ii) clicking a pre-determined button of the email interface.

STEP 604: Clustering the Plurality of Emails into at Least Two Clusters

The method 600 continues to step 604 with the server 106 configured to cluster the plurality of emails 210 and/or the set of emails 302 into at least two clusters. For example, in the case of the set of email 302 as depicted in FIG. 3, the set of emails 302 is clustered into two clusters 304 and 306, each of which have a respective subset of emails. The first cluster 304 has a first subset of emails 330 while the second cluster 306 has a second subset of emails 340.

It is contemplated that the server 106 may be configured to cluster a given plurality of emails (e.g., the set of emails 302) based on email features similarity. In some embodiments, the clustering by the server 106 may be executed using a KNN algorithm.

In one example, the clustering may be performed by the server 106 determining similarities in email "Subject" field. In an other example, the clustering may be performed by the server 106 determining whether emails have a common sender address. In a further example, the clustering may be performed by the server 106 performing various statistical analyses of email content (e.g., term frequency—inverse document frequency statistics of pre-selected words).

In at least some embodiments, it is contemplated that a given one of the at least two clusters determined by the server 106 may comprises at least two sub-clusters. For example, the cluster 502 (see FIG. 5) comprises two sub-clusters 504 and 506. In this case, it should be noted that, a given email may be clustered in both a respective cluster and a respective sub-cluster. For example, the email 511 is clustered in both the cluster 502 and the sub-cluster 504.

STEP 606: For a Given Cluster from the at Least Two Clusters, Determining a Respective Ground Truth Parameter for the Given Cluster The method 600 continues to step 606 with the server 106 configured to, for a given cluster from the at least two clusters, determine a respective ground truth parameter by analyzing the respective subset of emails and the associated user-interaction parameters, where the respective ground truth parameter being one of the spam email and the non-spam email.

With reference to FIG. 4, there is depicted the first subset of emails 320 (of the first cluster 304) associated with respective user-interaction parameters. For example, the emails 321, 322, 323, and 324 are respectively associated with user-interaction parameters 411, 412, 413, and 414.

The server 106 may be configured to compare the respective user-interaction parameters against one or more pre-determined thresholds for determining whether the ground truth parameter for the first cluster 304 is to be spam or non-spam.

In one example, in response to a majority of emails from the first subset of emails 320 being associated with respective user-interaction parameters that the respective recipients agreed with the respective emails being spam and/or disagreed that the respective emails are non-spam, the server 106 may determine that the ground truth parameter for the first cluster is spam.

Alternatively, instead of using a "majority" threshold (e.g., above 50%), the server 106 may use other pre-determined thresholds (above 70%, above 80%, etc.). How the pre-determined threshold is determined is not particularly limited. In one case, the operator of the email application 150 may determine a given value to be used as the pre-determined threshold. However, different values may be used as the pre-determined threshold for specific implementations of the present technology.

In some embodiments, the server 106 may be configured to determine ground truth parameters for only some of the clusters determined by the server 106. In some cases, the server 106 may analyze a total number of emails in a given subset of emails of a given cluster. The server 106 may, in response to the number being below an other pre-determined threshold, exclude this given cluster from further analysis (assignment of ground-truth parameter to this cluster).

However, it should be noted that other metrics associated with a given cluster may be analyzed by the server 106 in addition to, or instead of, the total number of emails in the respective subset of emails for potentially excluding the given cluster from being assigned with a ground-truth parameter. Such metrics may include a variety of ratios pre-selected by the operator of the email service for evaluating whether enough user-interactivity "knowledge" has been gathered for the emails in the given cluster for assigning a ground truth parameter to the given cluster. Such metrics may allow avoiding assignment of a ground truth parameter to a given cluster when not enough user-interaction data has been collected for the emails in the given cluster and/or until enough user-interaction data has been collected for the emails in the given cluster.

STEP 608: For a Given Cluster from the at Least Two Clusters, Assigning the Respective Ground Truth Parameter to the Given Cluster and Each of the Respective Subset of Emails Contained Therein The method 600 continues to step 608 with the server 106 assigning the respective ground truth parameter to the given cluster and each of the respective subset of emails contained therein. In some cases, the server 106 may be configured to store each email in the respective subset of emails in association with the ground truth parameter determined for the respective cluster.

In some embodiments of the present technology, recalling that a given email may be included in more than one "cluster level" (e.g., in a cluster and a sub-cluster, for example), the server 112 may be configured to assign a ground-truth parameter to that given email and which corresponds to the ground-truth parameter of a largest cluster/sub-cluster in which the email is located and for which enough user-interactivity "knowledge" has been gathered.

STEP 610: For a Given Email from the Given Cluster, Generating the Spam Prediction Error Parameter Based on a Difference Between the Spam Prediction Parameter and the Respective Ground Truth Parameter The method 600 continues to step 610 with the server 106 configured to, for a given email from the given cluster, generate a respective spam prediction error parameter based on a difference between the spam prediction parameter and the respective ground truth parameter.

Broadly speaking, the server 106 may be configured to determine the spam prediction error parameter for a given email by determining whether or not the respective ground truth parameter confirms the respective spam prediction parameter. For example, if the spam prediction parameter does not match the ground truth parameter, the server 106 may determine that the given email has been erroneously classified by the spam prediction algorithm 250.

STEP 612: For a Given Email from the Given Cluster, Storing the Spam Prediction Error Parameter in Association with the Given Email from the Given Cluster The method 600 continues to step 612 with the server 106 storing the spam prediction error parameter in association with the given email from the given cluster. For example, the server 106 storing the spam prediction error parameter in association with the given email from the given cluster in the database 108.

As mentioned above, in a situation where a given email is part of a cluster and of a sub-cluster of that cluster, the given email may be associated with two ground truth parameters, one for the respective cluster and one for the respective sub-cluster. In this case, the server 106 may be configured to compare the spam prediction parameter of the given email against each respective ground truth parameter, and in response to at least one of the ground truth parameters not matching the respective spam prediction parameter, the server 106 may determine that the spam prediction algorithm erroneously classified the given email.

In some embodiments, it is contemplated that the server 106 may be configured to adjust (train and/or re-train) the spam prediction algorithm 250 based on the spam prediction error parameters associated with respective emails. In some embodiments, the server 106 may use only erroneously classified emails for adjusting (train and/or re-train) the spam prediction algorithm 250.

In one non-limiting example, the server 106 may be configured to identify which emails are associated with respective spam prediction error parameters indicative of that the spam detection algorithm 250 erroneously classified the respective emails. So-identified emails may be used for generating additional training examples for the spam detection algorithm 250. For example, a given additional training example may include a feature vector representative of a given so-identified email and a label representative of the ground truth parameter associated with the so-identified email.

However, it should be noted that a specific way in which emails and respective spam prediction error parameters may be used for retraining the spam prediction algorithm 250 depends on inter alia how the spam prediction algorithm 250 is implemented. Again, the spam prediction algorithm 250 may be implemented in a variety of ways, and therefore, the particular way in which the emails and respective spam prediction error parameters are processed for generating additional training data may depend on a specific implementation of the present technology.

Modifications and improvements to the above-described implementations of the present technology may become apparent to those skilled in the art. The foregoing description is indented to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A method of determining a spam prediction error parameter for a spam prediction parameter generated by a spam detection algorithm executed by a server, the server associated with an email application and executing the spam detection algorithm, the method executed by the server, the method comprising:

receiving, by the server, an indication of a plurality of emails destined to a plurality of users of the email application, a given one of the plurality of emails having:

a respective spam prediction parameter indicative of the spam detection algorithm determining that the given one of the plurality of emails is one of a spam email and a non-spam email;

a user-interaction parameter indicative of whether an associated recipient of the plurality of users agrees with the respective spam prediction parameter;

clustering, by the server, the plurality of emails into at least two clusters, each one of the at least two clusters having a respective subset of emails;

for a given cluster from the at least two clusters:

determining, by the server, a respective ground truth parameter for the given cluster by analyzing the respective subset of emails and the associated user-interaction parameters, the respective ground truth parameter being one of the spam email and the non-spam email;

assigning the respective ground truth parameter to the given cluster and each of the respective subset of emails contained therein;

for a given email from the given cluster:

generating, by the server, the spam prediction error parameter based on a difference between the spam prediction parameter and the respective ground truth parameter;

storing, by the server, the spam prediction error parameter in association with the given email from the given cluster.

2. The method of claim 1, wherein the method further comprises:

determining, by the server, the user-interaction parameter based on at least one user interaction between the associated recipient and a respective email from the plurality of emails, the at least one user interaction having been collected from an email interface displayed to the associated recipient.

3. The method of claim 2, wherein the user interaction is at least one of (i) moving the respective email into a folder of the email interface, and (ii) clicking a pre-determined button of the email interface.

4. The method of claim 1, wherein the clustering the plurality of emails is executed based on email features similarity.

5. The method of claim 4, wherein the clustering is executed using a K-Nearest Neighbor (KNN) algorithm.

6. The method of claim 1, wherein the server further executes the email application.

7. The method of claim 1, wherein the server is configured to connect to a mail server executing the email application.

8. The method of claim 1, wherein the indication of the plurality of emails comprises the plurality of emails.

9. The method of claim 1, wherein the indication of the plurality of emails comprises an embedding of each of the plurality of emails, the embedding indicative of a content of the plurality of emails and devoid of any identifiers of associated recipients.

10. The method of claim 1, wherein the method further comprises:

analyzing, by the server, a total number of emails in a given subset of emails of an other given cluster from the at least two clusters; and in response to the number being below a pre-determined threshold, excluding, by the server, the other given cluster from further analysis.

11. The method of claim 1, wherein the method further comprises:

retraining, by the server, the spam detection algorithm by using the spam prediction error parameter.

12. The method of claim 1, wherein a given one of the at least two clusters comprises at least two sub-clusters.

13. The method of claim 12, wherein the given one plurality of emails is clustered in both the given one of the at least two clusters and one of the at least two sub-clusters.

14. The method of claim 13, wherein in response to the given one of the plurality of emails being associated with the ground truth parameter indicative of a wrong categorization in one of the given one of the at least two clusters and one of the at least two sub-clusters, a same value is used for the ground truth parameter for the given one plurality of emails.

15. The method of claim 13, wherein the ground truth parameter is independently assigned to the given one of the plurality of emails in one of the given one of the at least two clusters and one of the at least two sub-clusters.

16. A server for determining a spam prediction error parameter for a spam prediction parameter generated by a spam detection algorithm executed by the server, the server associated with an email application and executing the spam detection algorithm, the server comprising a processor and being configured to:

receive, by the processor, an indication of a plurality of emails destined to a plurality of users of the email application, a given one of the plurality of emails having:

a respective spam prediction parameter indicative of the spam detection algorithm determining that the given one of the plurality of emails is one of a spam email and a non-spam email;
a user-interaction parameter indicative of an associated recipient of the plurality of users agreeing with the respective spam prediction parameter;
cluster, by the processor, the plurality of emails into at least two clusters, each one of the at least two clusters having a respective subset of emails;
for a given cluster from the at least two clusters:
determine, by the processor, a respective ground truth parameter for the given cluster by analyzing the respective subset of emails and the associated user-interaction parameters, the respective ground truth parameter being one of the spam email and the non-spam email;
assign, by the processor, the respective ground truth parameter to the given cluster and each of the respective subset of emails contained therein;
for a given email from the given cluster:
generate, by the processor, the spam prediction error parameter based on a difference between the spam prediction parameter and the respective ground truth parameter;
store, by the processor, the spam prediction error parameter in association with the given email from the given cluster.

17. The server of claim 16, wherein the server is further configured to:
determine the user-interaction parameter based on at least one user interaction between the associated recipient and a respective email from the plurality of emails,
the at least one user interaction having been collected from an email interface displayed to the associated recipient.

18. The server of claim 17, wherein the user interaction is at least one of (i) moving the respective email into a folder of the email interface, and (ii) clicking a pre-determined button of the email interface.

19. The server of claim 16, wherein the clustering the plurality of emails is executed by the server based on email features similarity.

20. The server of claim 19, wherein the clustering is executed by the server using a K-Nearest Neighbor (KNN) algorithm.

* * * * *